United States Patent [19]

Ludwig et al.

[11] Patent Number: 4,922,404
[45] Date of Patent: May 1, 1990

[54] METHOD AND APPARATUS FOR GATING OF SYNCHRONOUS RECTIFIER

[75] Inventors: Gerald W. Ludwig, Scotia; Gerhard A. Franz, Schenectady, both of N.Y.

[73] Assignee: General Electric Company, Schenectady, N.Y.

[21] Appl. No.: 323,639

[22] Filed: Mar. 15, 1989

[51] Int. Cl.5 .......................................... H02M 7/217
[52] U.S. Cl. ...................................... 363/89; 363/127
[58] Field of Search ........................... 363/81, 89, 127

[56] References Cited

U.S. PATENT DOCUMENTS

| | | | |
|---|---|---|---|
| 3,582,758 | 6/1971 | Gunn | 321/47 |
| 3,667,028 | 5/1972 | Leufgen | 363/127 |
| 3,904,950 | 9/1975 | Judd et al. | 363/127 |
| 3,909,700 | 9/1975 | Ferro | 363/127 |
| 3,940,682 | 2/1976 | Park et al. | 363/127 |
| 4,399,499 | 8/1983 | Butcher et al. | 363/127 |
| 4,519,024 | 5/1985 | Federico et al. | 363/89 |
| 4,716,514 | 12/1987 | Patel | 363/89 |

Primary Examiner—Patrick R. Salce
Assistant Examiner—J. Sterrett
Attorney, Agent, or Firm—Marvin Snyder; James C. Davis, Jr.

[57] ABSTRACT

A synchronous rectifier circuit employs therein a pair of synchronously-operated switches, each switch being coupled between a separate respective input terminal and an output terminal of the circuit. One of the synchronously-operated switches is gated ON when a voltage applied across the synchronous rectifier circuit input terminals is of one polarity, and is gated OFF when current therein becomes substantially zero. The second switch is gated ON when a voltage applied across the input terminals is of the opposite polarity, and is gated OFF when current therein becomes substantially zero.

13 Claims, 4 Drawing Sheets

METHOD AND APPARATUS FOR GATING OF SYNCHRONOUS RECTIFIER

The present invention relates to rectifier circuits and more particularly to a method and apparatus for producing a timing sequence for use in controlling the commutation of one or more switches which form part of a synchronous rectifier circuit.

BACKGROUND OF THE INVENTION

Known synchronous rectifier circuits may be utilized, for example, to develop a rectified waveform, and include one or more synchronously-operated switches such as field effect transistors (FETs) which accomplish the rectification. Many forms of synchronous rectifier circuits exist, and one known synchronous rectifier circuit for developing a rectified waveform includes a transformer having a primary winding and a center-tapped secondary winding. This circuit includes as synchronously-operated switches n-type FETs, each having its drain connected to a separate output terminal, respectively, of the secondary winding. The sources of the FETs are connected in common, and the gate of each FET is operated by a control system which controls the commutation of each switch. The control system responds to the voltage applied across the primary winding of the transformer and generates gate control signals in accordance with the polarity, and usually magnitude, of the primary voltage. The gate control signals are 180° out-of-phase relative to each other and control each FET to conduct at less than 50% duty cycle. Accordingly, when one FET is conductive (gated ON), the other FET is not conductive (gated OFF). Both FETs are also gated OFF concurrently for some period of time. Thus when polarity of the primary winding voltage waveform becomes positive in a positive-going zero crossing, i.e. with a positive slope, the n-type FET connected to the negative output terminal of the secondary winding is gated ON. When the magnitude of the primary winding voltage waveform is substantially equal to zero, both n-type FETs are gated OFF. When the polarity of the primary winding voltage waveform becomes negative in a negative-going zero crossing, i.e. with a negative slope, the n-type FET connected to the now negative output terminal of the secondary winding is gated ON. In this manner, the synchronous rectifier circuit develops a rectified waveform.

The above-described gating sequence, in practice, results in undesirable noise, waste heat generation, and excessive power losses. Specifically, every transformer has some leakage inductance. Thus, even though the magnitude of the primary winding voltage waveform may have just become zero, a positive or negative output voltage will nevertheless be present due to the leakage inductance. Therefore, the voltage waveform across the primary winding is not linearly related to the magnitude of the signals present at the secondary winding output terminals, nor is it necessarily of the same polarity. The control system, however, generates gate control signals in accordance with the primary winding voltage waveform and hence is likely to cause an FET to commutate even while it is conducting. Commutating the FET during conduction creates unwanted noise in the rectifier output voltage.

Further, even if an FET is gated OFF, the parasitic diode known to be inherent in the FET is biased to conduct if the transformer leakage inductance develops sufficient secondary voltage. With known synchronous rectifier circuits, the parasitic diode inherent in an n-type FET connected to the negative output terminal of the secondary winding is biased to conduct, for example, when the magnitude of the primary winding voltage waveform is zero and positive-going. In this condition, although the FET has been gated OFF, the leakage inductance has developed sufficient voltage to cause continued current flow through the FET via the parasitic diode. Such current in the parasitic diode is undesirable since the parasitic diode is lossy, and dissipates excessive power. Further, in order for the parasitic diode to turn off, the current in the secondary winding must reverse in order to draw the stored charge out of the diode. This produces ringing, due to the leakage inductance, which results in excessive stress on the FET in the form of a voltage across the device that may reach sufficient amplitude to cause device failure, and which also deteriorates the signal-to-noise ratio of the synchronous rectifier output signal.

Noise, waste heat generation, and power losses which occur in the above-described synchronous rectifier circuit also occur in other known synchronous rectifier circuits. For example, input voltage pulses may be supplied to the synchronously-operated switches of a synchronous rectifier circuit to develop a DC signal. In this rectifier circuit, a synchronously-operated switch connected to the pulsed voltage source is gated ON when the pulsed voltage falls to zero and the synchronously-operated switch is gated OFF while the pulsed voltage substantially equals zero. Even though the output voltage of the pulsed voltage source is substantially equal to zero, current may nevertheless still be flowing in the parasitic diodes of the synchronously-operated switch. As previously stated, however, gating the synchronously-operated switch to the OFF condition during conduction is undesirable.

OBJECTS OF THE INVENTION

It is therefore an object of the present invention to provide a gating sequence for synchronous rectifier circuits which overcomes the foregoing disadvantages and shortcomings of known methods of operating synchronous rectifier circuits.

Another object of the present invention is to provide a method of gating a synchronous rectifier circuit which reduces device stress in synchronously-operated switches therein and also reduces noise in the output voltage of the circuit.

Yet another object of the present invention is to provide a synchronous rectifier circuit which enables synchronously-operated switches therein to operate with minimal power dissipation.

SUMMARY OF THE INVENTION

Briefly, in accordance with a preferred embodiment of the invention, the commutation of one or more synchronously-operated switches in a synchronous rectifier circuit is controlled in a new manner. A synchronously-operated switch is gated ON when input voltage supplied to the rectifier circuit is of a first polarity and magnitude, and is gated OFF as the magnitude of forward current in the switch closely approaches or becomes zero. If the synchronous rectifier circuit includes more than one synchronously-operated switch, each such switch is selectively gated ON when the input voltage is of a predetermined polarity and magnitude, and is gated OFF when the forward current in it closely approaches or becomes zero. By use of this new gating sequence, ringing, noise, excessive device stress and power losses caused by gating OFF a synchronously-operated switch during forward conduction are substantially reduced, if not entirely eliminated.

BRIEF DESCRIPTION OF THE DRAWING

The foregoing and other objects of the present invention, together with further features and advantages thereof, will become apparent from the following detailed specification when read together with the accompanying drawings, in which.

DETAILED DESCRIPTION OF THE INVENTION

Figure 1:
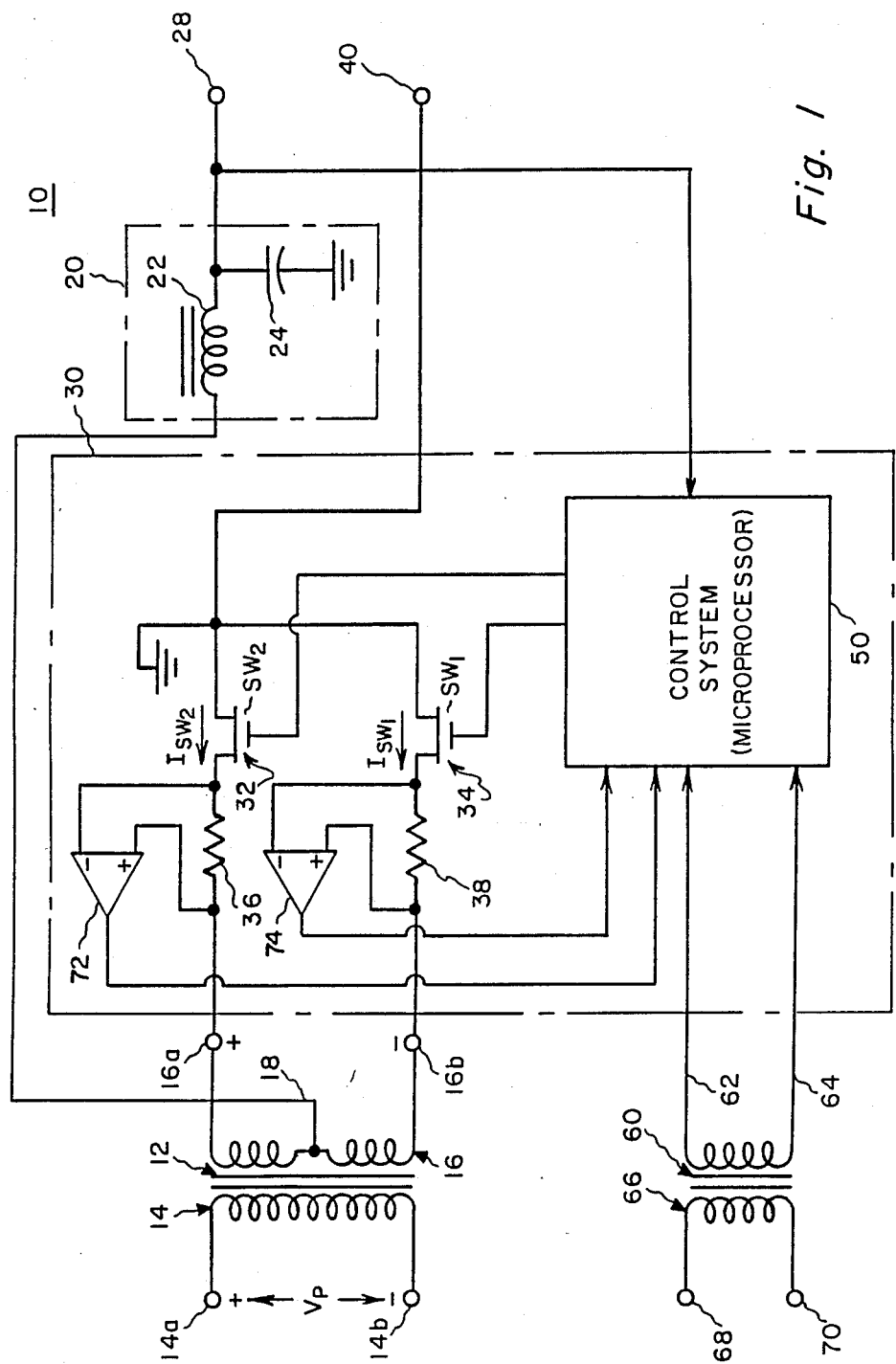
FIG. 1 a schematic diagram of a synchronous rectifier circuit which utilizes a new and improved gating sequence in accordance with the present invention.

FIG. 1 illustrates a synchronous rectifier circuit 10 which develops a rectified waveform and includes a transformer 12, an output filter 20, and a rectification section 30. Transformer 12 includes a primary winding 14 having positive and negative input terminals 14a and 14b, respectively, which serve as the input for rectifier circuit 10. Transformer 12 further includes a secondary winding 16 having a center tap 18 and positive and negative output terminals 16a and 16b, respectively. (The positive and negative designations on transformer 12 are supplied only to identify polarities of the primary and secondary windings in response to a positive-going positive voltage supplied to the input terminals of the primary winding.) Output filter 20, which is connected to the transformer center tap 18, includes an inductor 22 and a holding capacitor 24 which are connected in common to a synchronous rectifier circuit output terminal 28.

Rectification section 30 includes synchronously-operated switches 32 and 34 shown as n-type FETs connected at their input terminals, i.e. their drain electrodes, via current sensors 36 and 38, respectively, to transformer output terminals 16a and 16b, respectively, which serve as the inputs to the rectification section. FETs 32 and 34 have their source electrodes connected in common to ground at a second output terminal 40. The gate electrodes of FETs 32 and 34 are connected to a control system 50, which controls the commutation of FETs 32 and 34 by applying gate control signals to the respective gate terminals. System 50 requires, as an input signal, either the input voltage supplied to primary winding 14 of transformer 12, or a timing signal having a predetermined time relationship to the primary winding voltage so as to provide timing information concerning the input voltage, such as the timing of its zero crossings. The control system further requires information concerning current in each FET.

In synchronous rectifier circuit 10, timing information concerning the input voltage may be provided through a small transformer 60 which is connected to control system 50 through input leads 62 and 64. The turns ratio of transformer 60 is determined in accordance with the input signal applied to its primary winding 66 via terminals 68 and 70 and the desired voltage to be applied to control system 50. Information as to current in FETs 32 and 34 is provided through differential amplifiers 72 and 74, respectively. Amplifier 72 has its inputs connected across current sensor 36, and amplifier 74 has its inputs connected across current sensor 38. The outputs of amplifiers 72 and 74 are connected to control system 50. In some synchronous rectifier circuits, while it may appear possible, it may actually be undesirable to employ resistors as components 36 and 38 between each switch and the secondary winding output terminals because resistors increase the voltage drop across rectification section 30. In this situation, current flow information is preferably provided by other current sense means such as a current transformer in the manner shown in FIG. 4 and described, infra, or a Hall sensor.

Although not shown in FIG. 1, control system 50, instead of being connected to transformer 60, may be connected to the voltage source (not shown) which generates the input voltage supplied to primary winding 14. The control system is also connected to the synchronous rectifier circuit output terminal 28 so as to monitor the output signal for the purpose of regulating it by controlling the signal generating unit.

Figure 2:
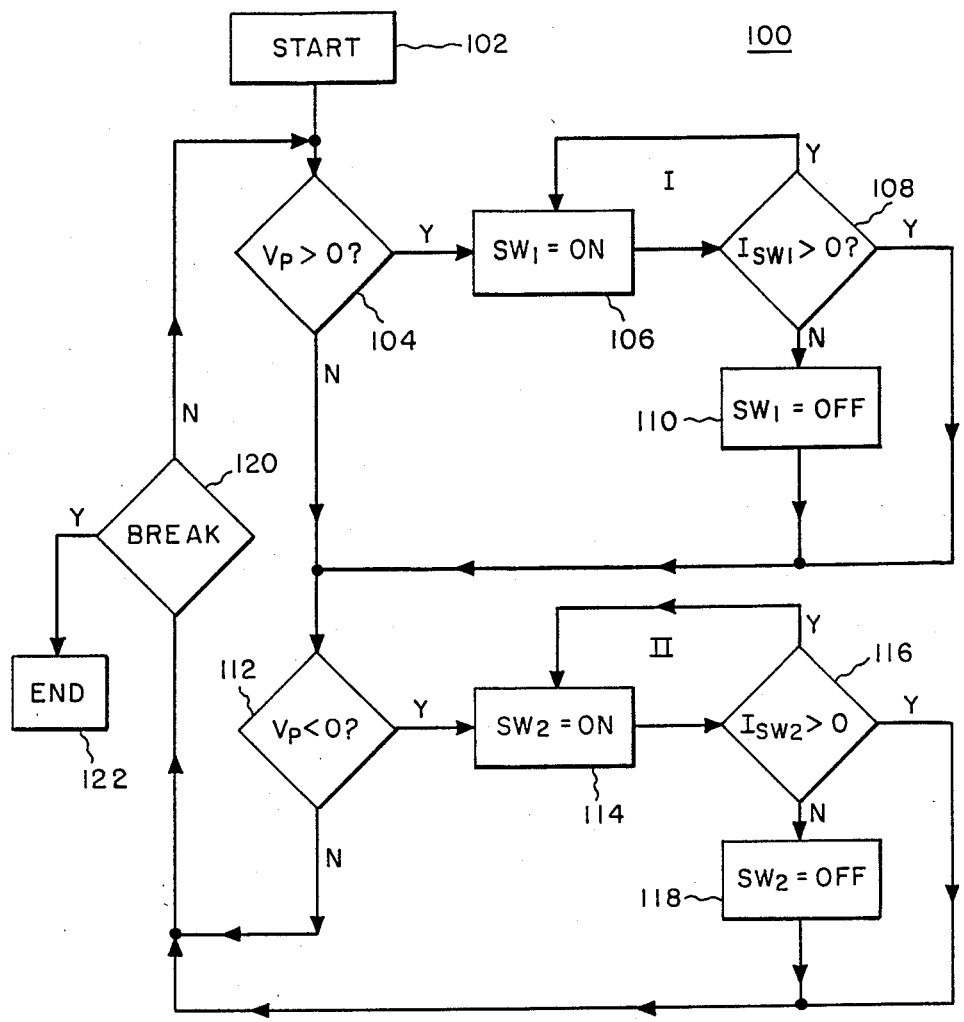
FIG. 2 is a flowchart illustrating the preferred method of operation of the control system illustrated in FIG. 1.

FIG. 2 illustrates in flowchart form the operation of control system 50 in accordance with the preferred embodiment of the present invention. Block 102 represents the starting point of the operation. Control system 50 is enabled when power is supplied thereto through transformer 60. Once the control system has been enabled, it determines whether voltage $V_p$ across the primary winding of transformer 12 (FIG. 1) is greater than zero, as indicated at block 104. If primary winding voltage $V_p$ is greater than zero, then switch SW1, which corresponds to FET 34 in FIG. 1, is gated ON, as indicated at block 106. After switch SW1 is gated ON, the system determines whether current $I_{sw1}$ in switch SW1 is greater than zero, as indicated at decision block 108. If the current in switch SW1 is greater than zero, then loop I is activated and switch SW1 remains gated ON until current $I_{sw1}$ becomes equal to zero. At that time, switch SW1 is gated OFF, as indicated at block 110.

Regardless of whether switch SW1 is ON or OFF, the system determines whether primary winding voltage $V_p$ is less than zero, as indicated at block 112. If the amplitude of voltage $V_p$ has fallen below zero, then switch SW2, which corresponds to FET 32 of FIG. 1, is gated ON, as indicated at block 114. The system then determines whether current $I_{sw2}$ in switch SW2 is greater than zero, as indicated at decision block 116. If current $I_{sw2}$ is greater than zero, then loop II is activated and switch SW2 remains gated ON until current $I_{sw2}$ becomes equal to zero. At that time, switch SW2 is gated OFF, as indicated at block 118.

System 50 continues to operate until a BREAK command is received. The BREAK command is generated, as indicated by decision block 120, when current $I_{sw2}$ is greater than zero, or when switch SW2 is gated OFF, or when the amplitude of voltage $V_p$ is less than zero. As long as no BREAK command is received, control system 50 of FIG. 1 continues to determine whether the amplitude of voltage $V_p$ is greater than zero. When a BREAK command is received, the control system stops operating, as indicated at block 122.

With reference to synchronous rectifier circuit 10 of FIG. 1, when the voltage across primary winding 14 becomes positive, as indicated by the signal present on input leads 62 and 64, control system 50 supplies a gate control signal to FET 32 that renders FET 32 conductive. The control system maintains the gate control signal on FET 32 until the forward current in FET 32 closely approaches, or becomes equal to, zero. At this juncture, an output signal produced by differential amplifier 72 causes control system 50 to remove the control signal from the gate of FET 32, rendering FET 32 nonconductive. Similarly, as the voltage amplitude across primary winding 14 becomes negative, control system 50 supplies FET 34 with a gate control signal that renders FET 34 conductive. The control system maintains the control signal from the gate of FET 34 until the current in FET 34 closely approaches, or becomes equal to, zero. At this juncture, an output signal produced by differential amplifier 74 causes the control signal to remove the control signal from the gate of FET 34, rendering FET 34 nonconductive.

In accordance with the present invention, neither of synchronously-operated switches 32 and 34 is gated OFF until the current therein substantially approaches or equals zero, and either synchronously-operated switch may operate at over 50% duty cycle. This improved gating sequence eliminates the signal ringing and excessive power loss which occur if either synchronously-operated switch is gated OFF in the presence of forward current therein.

Figure 3:
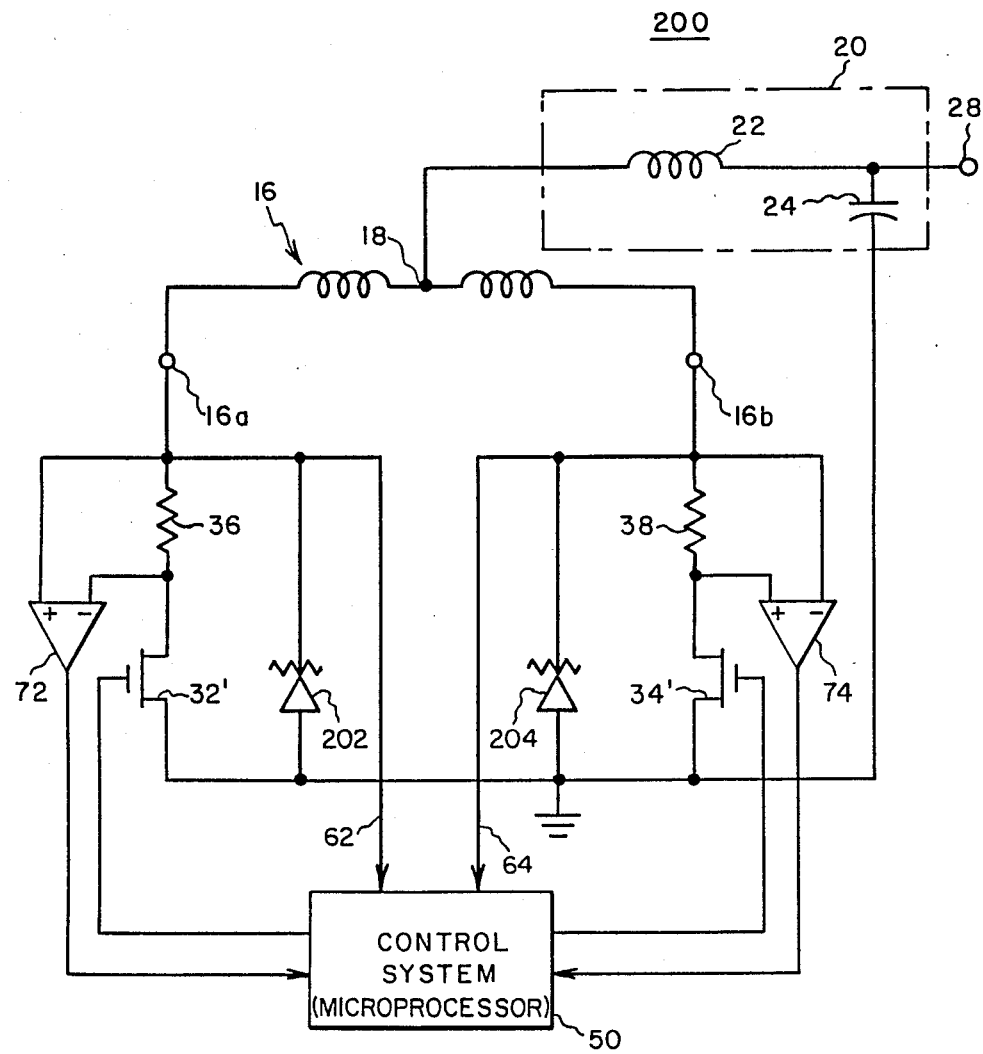
FIG. 3 is a schematic diagram of another embodiment of synchronous rectifier circuit with which the new and improved gating sequence may be utilized.
Figure 4:
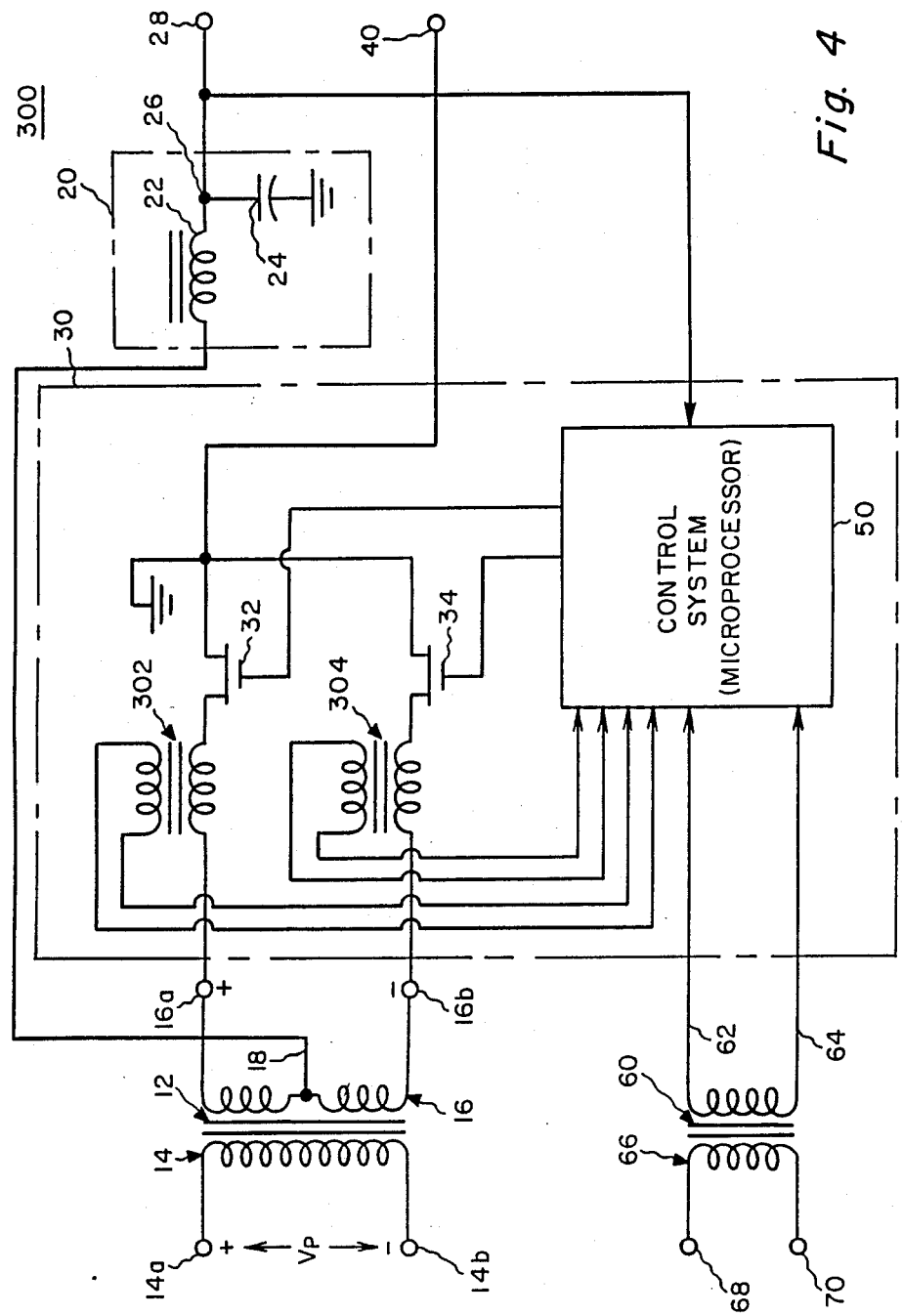
FIG. 4 is a schematic diagram of yet another synchronous rectifier circuit with which the new and improved gating sequence may be utilized.

FIG. 3 illustrates another embodiment of a synchronous rectifier circuit 200 which may be operated with the same gating sequence used with the circuit of FIG. 1. The circuit of FIG. 3 is substantially similar to the circuit of FIG. 10 of application Ser. No. 186,983, filed Apr. 27, 1988 and assigned to the present assignee. In the circuit of FIG. 3 of the present application, output filter 20 has the input end of its inductor 22 connected to tap 18 of the transformer secondary winding 16. A first synchronously-operated switch 32' is connected between output terminal 16a of the secondary winding and ground. A first Schottky diode 202 is connected in parallel with synchronously-operated switch 32' with its anode connected to ground and its cathode connected to terminal 16a. A similar parallel connection of a second synchronously-operated switch 34' and a second Schottky diode 204 is made between a second outer end 16b of the secondary winding and ground. In operation, synchronously-operated switches 32' and 34' are commutated when appropriate signals are present at output terminals 16a and 16b, and each switch is gated OFF when current therein substantially equals zero. The circuit of FIG. 3 is shown primarily to illustrate that the synchronously-operated switch gating sequence described in conjunction with FIGS. 1 and 2 may also be utilized with other synchronous rectifier circuits. FIG. 4 illustrates yet another embodiment of a synchronous rectifier circuit 300 in accordance with the present invention and includes current transformers 302 and 304 connected to control system 50. The signals provided to control system 50 from the current transformers carry information regarding current in each synchronously-operated switch coupled thereto, respectively. Synchronous rectifier circuit 300 operates in the same manner as synchronous rectifier circuit 10 shown in FIG. 1.

While the present invention has been described with respect to specific embodiments, many modifications, variations, substitutions and equivalents will now be apparent to those skilled in the art. For example, a delay occurs if the control system must detect zero current in an FET before gating OFF the FET. This delay is undesirable because the FET conducts unwanted current during the delay period, i.e., the current during this period reverses and increases in the reverse direction, so that the FET will be gated OFF in the presence of current therein. voltage has undergone a polarity reversal. The delay can be compensated for by having the control system remove the gate drive from the FET when the current amplitude is greater than zero but substantially below the peak, such as at six amperes, immediately prior to an appropriate crossing. In this manner, the delay is rendered harmless since the FETs are gated OFF when the current therein equals zero.

Various types of control systems may be utilized with the present invention. For example, as indicated in FIGS. 1, 3 and 4, control system 50 may be 5 microprocessor-based, controlled by an application program stored in a read only memory (ROM) that operates the microprocessor in accordance with the flowchart illustrated in FIG. 2. Further, synchronous rectifier circuits that convert voltage pulses to a DC output voltage can also be controlled with the gating sequence described herein. Accordingly, the invention is intended to be limited only by the spirit and scope of the appended claims.

What is claimed is:

1. A synchronous rectifier circuit, comprising:
   a transformer including a primary winding for receiving an input voltage and a secondary winding having first and second transformer output terminals and a center tap;
   first and second switch means;
   means coupling said first and second switch means to said first and second transformer output terminals respectively;
   means for developing first and second current signals representative of current in said first and second switch means respectively;
   means for deriving a timing signal having a predetermined time relationship to said input signal;
   control means responsive to said first and second current signals and said timing signal;
   means coupling said control means to said first and second switch means to render said switch means conductive or nonconductive in accordance with said first and second current signals and said timing signal;
   a first synchronous rectifier circuit output terminal coupled to said first and second switch means;
   a second synchronous rectifier circuit output terminal; and
   means coupling said center tap to said second synchronous rectifier circuit output terminal.

2. The synchronous rectifier circuit of claim 1 wherein each of said switch means, respectively, comprises a FET, respectively, having a source electrode and a drain electrode, the source electrodes of each of said first and second switch means, respectively, being connected to said first synchronous rectifier output terminal, the drain electrode of each of said first and second switch means, respectively, being coupled to said first and second transformer output terminals, respectively, and wherein said means coupling said center tap to said second synchronous rectifier circuit output terminal comprises an output filter.

3. The synchronous rectifier circuit of claim 2 wherein said output filter comprises an inductor connected between said center tap and said second synchronous rectifier circuit output terminal, and a capacitor coupled between said first and second synchronous rectifier circuit output terminals.

4. A synchronous rectifier circuit in accordance with claim 1 wherein said rectifier circuit further comprises an output filter including an inductor connected between said center tap and said second rectifier circuit output terminal and a capacitor coupled between said second rectifier circuit output terminal and ground, each of said switch means being coupled between one of said transformer output terminals and ground.

5. The synchronous rectifier circuit of claim 4 wherein each of said means for developing a current signal, respectively, is coupled in series with a separate one of said first and second switch means, respectively, said synchronous rectifier circuit further comprising a Schottky diode connected, respectively, in parallel with each of the series-connected switch means and means for developing a current signal, respectively, each of said Schottky diodes being oriented to conduct forward current to the corresponding transformer output terminal coupled thereto.

6. The synchronous rectifier circuit of claim 1 wherein each of said means for developing a current signal comprises a resistive impedance coupled between a respective transformer output terminal and a respective one of said switch means, and a differential amplifier connected across said resistive impedance.

7. The synchronous rectifier circuit of claim 1 wherein each of said means for developing a current signal comprises a current transformer coupled between a respective transformer output terminal and a respective one of said switch means.

8. The synchronous rectifier circuit of claim 1 wherein each of said means for developing a current signal comprises a Hall sensor coupled between a respective transformer output terminal and a respective one of said switch means, and a differential amplifier connected across said Hall sensor.

9. The synchronous rectifier circuit of claim 1 wherein said control means comprises a microprocessor for rendering said first switch means conductive when said timing signal is of a first polarity and magnitude and for rendering said first switch means nonconductive when current therein is substantially zero, and for rendering said second switch means conductive when said timing signal is of a second polarity and magnitude and for rendering said second switch means nonconductive when current therein is substantially zero.

10. The synchronous rectifier circuit of claim 1 including means coupling said control means to said second synchronous rectifier output terminal, said control means thereby being responsive further to the output voltage of said synchronous rectifier.

11. The synchronous rectifier circuit of claim 1 wherein said first switch means includes a first field effect transistor having its drain electrode coupled to said first output terminal of said transformer, said second switch means includes a second field effect transistor having its drain electrode coupled to said second output terminal of said transformer, the source electrodes of said field effect transistors being jointly coupled to said first synchronous rectifier circuit output terminal, and wherein said means coupling said control means first and second switch means couples the gate electrodes of each of said field effect transistors to said control means.

12. A method of gating switch means coupled between input and output terminals in a synchronous rectifier circuit, said method comprising the steps of:
applying a voltage of alternate polarity to said input terminals;
gating ON said switch means when said voltage applied to said input terminals is of a predetermined polarity and magnitude;
determining current flow in said switch means; and
gating OFF said switch means so as to render said switch means nonconductive upon cessation of the current flow therein.

13. A method of gating first and second switch means in a synchronous rectifier circuit, said circuit having first and second input terminals and a pair of output terminals, said first and second switch means being connected to control current flow from said first and second input terminals, respectively, to said output terminals in the presence of an input voltage across said input terminals, said method comprising the steps of:
applying a voltage of alternate polarity across said input terminals;
determining current flow in said first and second switch means;
gating ON said first switch means when the voltage across said input terminals is of a first polarity;
gating OFF said first switch means so as to render said first switch means nonconductive upon cessation of current flow therein;
gating ON said second switch means when the voltage across said input terminals is of a second polarity; and
gating OFF said second switch means so as to render said second switch means nonconductive upon cessation of current flow therein.

* * * * *